United States Patent
Sommer et al.

(10) Patent No.: US 7,602,545 B2
(45) Date of Patent: Oct. 13, 2009

(54) GAIN-FLATTENING APPARATUS AND METHODS AND OPTICAL AMPLIFIERS EMPLOYING SAME

(75) Inventors: Rad Sommer, Sebastopol, CA (US); Rance M. Fortenberry, Cazadero, CA (US)

(73) Assignee: Bookham Technology, plc, Towcester, Northamptonshire (GB)

( * ) Notice: Subject to any disclaimer, the term of this patent is extended or adjusted under 35 U.S.C. 154(b) by 0 days.

(21) Appl. No.: 11/480,654

(22) Filed: Jun. 22, 2006

(65) Prior Publication Data

US 2006/0268394 A1 Nov. 30, 2006

Related U.S. Application Data

(63) Continuation-in-part of application No. 10/874,559, filed on Jun. 23, 2004.

(60) Provisional application No. 60/802,740, filed on May 23, 2006.

(30) Foreign Application Priority Data

May 10, 2004 (GB) ................................ 0410233.1

(51) Int. Cl.
*H04B 10/17* (2006.01)
*H04B 10/12* (2006.01)
(52) U.S. Cl. ................................ 359/337.1; 359/337.4
(58) Field of Classification Search ............ 359/337.1, 359/337.4; 398/149
See application file for complete search history.

(56) References Cited

U.S. PATENT DOCUMENTS 6,134,047 A * 10/2000 Flood et al. ............ 359/337.12

6,275,328 B1 8/2001 Parry et al.
(Continued)

FOREIGN PATENT DOCUMENTS

EP 1033794 9/2000

(Continued)

OTHER PUBLICATIONS

United Kingdom Search Report for GB0614165.9.

(Continued)

*Primary Examiner*—Eric Bolda
(74) *Attorney, Agent, or Firm*—Banner & Witcoff, Ltd.

(57) ABSTRACT

Gain-flattening components for compensation of at least a portion of the spectral gain profile of an optical amplifier comprises an optical substrate having at least a first gain-flattening filter disposed on a first surface of the optical substrate and a second gain-flattening filter disposed on a second surface of the optical substrate. The first gain-flattening filter has a transmission curve with a spectral loss profile for optical signals in the optical wavelength range, and has a net insertion loss error function relative to the spectral gain profile of an optical amplifier. The spectral loss profile of the second gain-flattening filter corresponds to the net insertion error function of the first gain-flattening filter. Gain-flattening optical amplifiers comprise one or more such gain-flattening components and at least one optical signal amplifier. Methods of producing gain-flattening components comprise:
  designing a primary gain-flattening filter to flatten the spectral gain profile of an optical amplifier;
  disposing on a first surface of an optical substrate a first gain-flattening filter according to the design of the primary gain-flattening filter;
  determining the error function of the coated substrate;
  designing a tweaker filter with a spectral loss profile corresponding to the error function of the coated substrate; and
  disposing on the second surface of the optical substrate a second filter according to the design of the tweaker filter.

14 Claims, 4 Drawing Sheets

U.S. PATENT DOCUMENTS

| | | | |
|---|---|---|---|
| 6,445,493 B2 * | 9/2002 | Kohnke et al. | 359/337.1 |
| 6,611,371 B2 * | 8/2003 | Wigley et al. | 359/337.2 |
| 2002/0154387 A1 | 10/2002 | Mori et al. | |
| 2002/0191274 A1 * | 12/2002 | Abe et al. | 359/337.1 |
| 2003/0123135 A1 | 7/2003 | Terahara | |
| 2003/0179997 A1 | 9/2003 | Hwang et al. | |
| 2003/0202745 A1 * | 10/2003 | Molina et al. | 385/37 |
| 2004/0165819 A1 | 8/2004 | Huang et al. | |

FOREIGN PATENT DOCUMENTS

| | | |
|---|---|---|
| EP | 1073220 A1 | 1/2001 |
| JP | 2003329830 A | 11/2003 |
| WO | 0045479 | 8/2000 |

OTHER PUBLICATIONS

International Search Report issued in PCT/GB2005/050029.

* cited by examiner

GAIN-FLATTENING APPARATUS AND METHODS AND OPTICAL AMPLIFIERS EMPLOYING SAME

INTRODUCTION

The present invention relates to certain improved gain-flattening apparatus, including gain-flattening apparatus suitable for use in optical systems, such as telecommunication systems or other systems employing optical signals, and to improved methods of producing and using gain-flattening apparatus, and to gain-flattened amplifiers incorporating such gain-flattening apparatus.

CROSS-REFERENCE

This application claims the priority benefit of British Patent Application No. 0410233.1, filed May 10, 2004 and Utility patent application Ser. No. 10/874,559, filed Jun. 23, 2004, the disclosure of which is hereby expressly incorporated herein.

BACKGROUND

Optical signal systems wherein multiple signal channels are carried by optical fibers or other waveguides over extended distances are known to employ optical amplifiers to batch-amplify all of the signal channels simultaneously. Commercially employed optical amplifiers typically provide an uneven level of gain across their optical wavelength range. For example, erbium-doped fiber amplifiers (EDFAs) operating in the C-band (generally 1525 nm to 1575 nm) produce a well known two-peaked spectral gain profile. In a typical telecommunication optical system, for example, the gain spectrum or modulation depth of an EDFA, also referred to as the insertion loss variation, gain profile, etc., can range up to 15 dB and beyond. This is generally undesirable, as flat gain characteristics, i.e., level signal strength across the operating bandwidth of the system, typically are important in multiplexed optical systems for increased transmission distance, reduced signal-to-noise ratios and other non-linear effects, or to meet other operating requirements of the system.

It is known, therefore, to employ gain-flattened amplifiers, such as gain-flattened optical fiber amplifiers or other gain-flattened optical amplifiers. Gain-flattened amplifiers may be constructed using either active elements or passive elements to flatten the gain, i.e., to provide gain equalization, also referred to as optical equalization or gain compensation, or compensation of the spectral gain profile of the optical amplifier, etc. Optical fiber gratings and dielectric thin-film filters, for example, are well known and used commercially for gain-flattening.

It is known, for example to employ a dielectric thin-film gain-flattening filter with an optical amplifier, e.g., an EDFA or other optical fiber amplifier to construct a gain-flattened amplifier. Thin-film gain-flattening filters have advantageous properties, including low insertion loss, small size, economical design and manufacturing costs, acceptable environmental stability, etc. Dielectric thin-film filters are known to have maximum peak loss of about 6 dB (with acceptable quality for typical applications such as telecommunications, e.g., acceptably low PPEF, discussed further, below) under the current state of the art for their design and manufacture. See Recent Advances in Thin Film Filters, Robert B. Sargent. In published U.S. patent application 2003/0179997 A1 of Hwang et al., which is incorporated herein by reference in its entirety for all purposes, it is suggested to employ multiple thin-film gain-flattening filters together in series where the optical amplifier requires a peak loss exceeding the maximum peak loss of one filter, e.g., two 5 dB filters in series to provide a total gain compensation or gain correction of 10 dB. In the operative wavelength band of the amplifier, the thin-film gain-flattening filter is designed to have a transmission curve showing an attenuation profile, also referred to as loss curve, loss profile, spectral loss profile, peak loss, etc. corresponding to the gain profile of the amplifier. That is, as understood by those of ordinary skill in the art, the gain-flattening filter has a spectral loss profile corresponding to the gain profile of an optical amplifier in that it is designed to have a spectral response matching or tracking the inverse of the amplifier's gain profile. As a result, the spectrum of optical signals passing through both the amplifier and the gain-flattening filter in combination achieve roughly even amplification, i.e., nearly flat gain.

Typically, the optical amplifier producer or optical system designer specifies the desired attenuation curve, commonly referred to as the target loss profile, for a gain-flattening device to be used with an optical amplifier in the optical system. The gain-flattening device producer designs the filter to have a transmission curve matching the target loss profile as nearly as is reasonably possible. Design limitations may result in the theoretical transmission curve of the gain-flattening differing somewhat from the target curve. In addition, the actual transmission curve of the gain-flattening device may differ slightly from its theoretical transmission curve, due to the effect of manufacturing tolerances, e.g., in the case of thin-film filters, natural variations in the characteristics of the thin-films deposited to form the filter, minute substrate irregularities, etc. Thus, the actual transmission curve of the gain-flattening filter or other device will always or almost always differ slightly from the target curve. The difference over the wavelength range of interest is referred to as the insertion loss error function of the gain-flattening device, or simply its error function. The magnitude of the difference, measured typically in decibels or percentage, generally varies from one wavelength to another across the span of the transmission curve. The peak-to-peak error function or PPEF is the magnitude of the difference between the target curve and the actual (gain-flattened) transmission curve at the wavelength where the amplification gain was most under-corrected plus the magnitude of the difference between the target curve and the actual transmission curve at the wavelength where the amplification gain was most over-corrected. The purchaser of gain-flattening apparatus typically specifies a maximum permissible PPEF. Alternatively or in addition, a maximum difference, typically in decibels, may be specified for every point along the wavelength range of interest, e.g., a maximum difference of 0.2 dB (or other value) may be specified, such that the actual curve must be within 0.2 dB of the target curve at every wavelength within the range of interest.

The error functions of gain-flattening filters and other gain-flattening devices are somewhat dependent on the desired attenuation profile, and thin-film gain-flattening devices such as filters show larger error functions as the attenuation profile or modulation depth becomes larger or more complex. Typically, the PPEF is approximately 10% or less of the modulation depth. Thus, for example, if one or more thin-film gain-flattening filters are used to correct 6 dB of modulation depth, the PPEF can be expected to be about 0.6 dB, and correcting 12 dB of modulation depth will result in a PPEF of about 1.2 dB. In this regard it is a problem that if multiple thin-film gain-flattening filters are used in series, such as suggested by Hwang et al. cited above, for example, two thin-film gain-flattening filters each correcting 6 dB of modulation depth for a total gain compensation of 12 dB, the error function and PPEF tend to accumulate. The error function tends to accumulate because thin-film gain-flattening filters typically have systematic error functions. That is, the gain correction error as a function of wavelength will be similar or even nearly identical from one thin-film gain-flattening filter to the next, especially in the typical case of using multiple filters designed to the same target loss profile and/or manufactured in the same batch, i.e., from the same wafer. A stack of thin-films is deposited in sequence onto the surface of a large wafer that is transparent in the wavelength band of interest, resulting in nearly uniform filter properties across the wafer surface. The wafer is then diced into small pieces, e.g., 1.0 mm by 1.0 mm up to 2.0 mm by 2.0 mm or larger. The chips can then be packaged in a suitable housing, optionally together with other components for the gain-flattening filter apparatus and/or gain-flattened amplifier, such as, e.g., collimating lenses, isolators, ferrules, monitor ports, taps or mux/demux components for adding or dropping channels, supervisory channels, etc. As a result, however, thin-film gain-flattening filters from the same batch have not only the same transmission curve, i.e., the same or similar gain correction performance, but also the same or similar error function. That is the gain correction error as a function of wavelength will be nearly identical from one component to the next as a consequence of their batch manufacturing process. Consequently, cascading gain-flattening filters having such systematic errors, either by packaging multiple filters into a common housing or positioning multiple discrete gain-flattening filters in series along an optical fiber path, will cause an accumulation of error. See Gain-flattening of High-Performance Optical Amplifiers, Arkell W. Farr, Teraxion Inc. (Cap-Rouge, Canada). Similar error function concerns are raised with other gain-flattening devices.

It is an object of the present invention to provide improved gain-flattening apparatus and methods. It is another object to provide improved methods of designing and producing gain-flattening apparatus. Additional objects and advantages of the present invention will be apparent from the following disclosure of the invention and from the detailed description of certain exemplary embodiments.

SUMMARY

As noted above, the spectral gain profile of an optical amplifier for optical signals in an optical wavelength range may not, without compensation, meet the required profile. An optical amplifier manufacturer or an optical system designer typically provides a spectral loss profile required of a gain-flattening filter to be used with an amplifier. In accordance with one aspect of the present disclosure, gain-flattening components are provided for compensation of the spectral gain profile of optical amplifiers. It will be understood by those killed in the art, given the benefit of this disclosure, that the gain-flattening components disclosed here are operative or designed for compensation of the spectral gain profile of associated optical amplifiers in the sense of that they compensate (i.e. flatten) the amplifier's gain profile either completely or partially. Typically, complete or almost complete gain flattening is desirable or required for optical telecommunications systems, for example. The gain-flattening components disclosed here each comprises an optical substrate, a first gain-flattening filter, e.g. a thin-film filter, disposed on a first surface of the optical substrate, and a second gain-flattening filter, e.g., again, a thin-film filter, disposed on a second surface of the optical substrate. Thus, the filter-coated substrates or chips in accordance with this disclosure may for convenience be referred to as a 2-sided chip or a 2-sided optical substrate. They may, for convenience, be referred to as GFF components, whether or not in assembly or otherwise combined with other components, housing, etc. Also, a 2-sided optical substrates, especially if in assembly with other 2-sided optical substrates and/or other components, may be referred to as GFF apparatus. A GFF component or apparatus in accordance with this disclosure may comprise one or more such 2-sided optical substrates, in series, parallel, cascade, or a combination thereof. The first filter may be referred to here and in the appended claims as the primary GFF filter or as the gross GFF filter or the like. The second GFF filter may be referred to here and in the appended claims as the "tweak" filter or as the correction filter.

The spectral loss profile of the first filter corresponds to the spectral gain profile of an optical amplifier for optical signals in an optical wavelength range. Thus, the first filter flattens the amplifier's gain profile, typically bringing the gain close to a target. The first filter does not perfectly flatten the amplifier's gain profile and rather has a net insertion loss error function relative to the spectral gain profile of the associated optical amplifier for optical signals in the optical wavelength range. The second gain-flattening filter disposed on the second surface of the optical substrate, e.g., on an opposite surface, has a transmission curve with a spectral loss profile for optical signals in the optical wavelength range, which spectral loss profile corresponds to the aforesaid net insertion error function of the first gain-flattening filter. Thus, the first filter and the second filter cooperate to provide compensation for the spectral gain profile of an associated optical amplifier.

The 2-sided optical chip may be packaged in a housing, e.g. a sealed or unsealed housing, e.g., an hermetically sealed housing. In certain exemplary embodiments the housing may be of the type known for use in the packaging of commercial DWDM filters and the like or for other optical devices. Further, the gain-flattening components disclosed here optionally can be mounted in a housing with other components, including other optical components, for example isolators, lenses etc. For example, one or more of the 2-sided optical chips may be mounted in a housing together with one or more optical amplifiers, e.g., an EDFA, or optical amplifier components, e.g. a coil of erbium-doped optical fiber. In accordance with certain exemplary embodiments, gain-flattening filter apparatus in accordance with this disclosure comprises a housing, a first ferrule disposed in the housing and providing an input optical fiber for carrying optical signals into the housing, and a second ferrule disposed in the housing and providing an output optical fiber for carrying optical signals out of the housing. An optical path extends in the housing between the input port and the output port established by the ferrules. The optical substrate is positioned inside the housing, with the first and second thin-film filters of the optical substrate oriented in the optical path between the input and output ports. The first and second filters typically may be positioned in either orientation, that is, with either filter upstream of the other filter in the optical path.

In accordance with various exemplary embodiments, the gain-flattening components disclosed here may be operative in the C-band. Thus, for example, the first filter on the first surface of the optical substrate can have a transmission curve in the C-band with a spectral loss profile corresponding to an EDFA spectral gain profile in the C-band, and the second filter on the second surface of the optical substrate correspondingly has a transmission curve in the C-band with a spectral loss profile corresponding to the error function of the first thin-film filter for optical signals in the C-band. In accordance with other exemplary embodiments, the optical wavelength range is in the L-band, the S-band or other wavelength range.

In accordance with a method aspect of this disclosure, a GFF component is produced. The GFF component is, or comprises, a 2-sided optical substrate as disclosed above, having a transmission curve with a spectral loss profile corresponding to a target loss profile for an associated optical amplifier. A method in accordance with this aspect of the disclosure comprises designing a primary gain-flattening filter, depositing, e.g., by sputtering or other method, or otherwise disposing on a first surface of an optical substrate a first gain-flattening filter according to the design of the primary gain-flattening filter, determining the error function of the coated substrate with the first filter applied, designing an adjustment or tweaker filter with a spectral loss profile corresponding to the error function of the coated substrate, and disposing a second filter according to the design of the tweaker filter on the second surface of the optical substrate. The second filter can be disposed from the second surface of the optical substrate by the same method used to apply the first filter or by a different method. The second gain-flattening filter in accordance with certain exemplary embodiments is applied to the second surface of the optical substrate without altering the transmission shape of the first gain-flattening filter.

In accordance with certain exemplary embodiments, a method in accordance with this disclosure for producing a gain-flattening component comprises:

designing a primary gain-flattening filter to be disposed on a first surface of an optical substrate to yield a target loss profile with a net insertion loss error function relative to the spectral gain profile of an optical amplifier for optical signals in an optical wavelength range;

manufacturing a first GFF component comprising depositing or otherwise disposing on a first surface of an optical substrate a first gain-flattening filter according to the design of the primary gain-flattening filter;

determining the error function of the first GFF component;

designing a tweaker gain-flattening filter with a spectral loss profile corresponding to the error function determined for the first GFF component, to be disposed on a second surface of the optical substrate to adjust the transmission curve of the GFF component; and disposing on the second surface of the GFF component a second gain-flattening filter according to the design of the tweaker gain-flattening filter.

It should be understood that, as used here and in the appended claims, a filter is disposed on a surface of an optical substrate "according to the design" (or similar terminology) for that filter in the sense that the filter, as deposited or otherwise applied or disposed on the substrate, corresponds to or follows the filter's design generally within the accuracy or tolerance limits of the production technique and equipment used. Typically, an actual filter differs at least somewhat from the theoretical design of the filter, e.g., due to deposition control limitations, imperfections in the surface of the substrate, etc.

In accordance with certain exemplary embodiments of the methods disclosed here, one or both of the filters is tuned prior to or after assembly, for example, prior to or after being positioned in a housing. For example, the method may further comprise temperature tuning the first and second gain-flattening filters relative to each other.

In certain exemplary embodiments of the methods and devices disclosed here, the first and second filters of the 2-sided GFF component (regardless whether or not used or intended to be used with one or more additional filters, Bragg gratings, etc. for additional gain-flattening) can be deposited on separate optical substrates. The two substrates then are optically or otherwise (e.g., by gluing, etc.) bonded or joined together to form a single, 2-sided optical substrate (i.e., an optical substrate with a filter on each of two different sides, as disclosed above). Advantageously, each of the two filters can be separately tuned, e.g., temperature tuned, before the two parts are joined together. In certain such techniques, the uncoated side of one or both of the single-coated substrates can be ground to reduce the thickness of the substrate to a desired thickness less than its original thickness. Optionally, a bevel or angle can be imparted during this step such that the two GF filters, i.e., the two coated sides of the final, joined substrate, are not perfectly parallel to each other. The angle may be, for example, from 0.5 to 3 degrees, e.g., 1 to 2 degrees or the like.

Gain-flattening optical amplifiers are provided in accordance with another aspect of this disclosure. A gain-flattening optical amplifier in accordance with this aspect comprises at least one optical signal amplifier and at least one gain-flattening component (again, referred to alternatively as gain-flattening apparatus). The optical signal amplifier is operative at least to receive, amplify and output optical signals in an optical wavelength range. The gain-flattening apparatus is operative at least for compensation of the spectral gain profile of the optical amplifier for optical signals in the optical wavelength range that have been amplified by the optical amplifier. In accordance with certain exemplary embodiments, the gain flattening component comprises an optical substrate, a first gain-flattening filter disposed on a first surface of the optical substrate, and a second gain-flattening filter disposed on a second surface of the optical substrate. The second gain-flattening filter has a spectral loss profile corresponding to the net insertion error function of the first gain-flattening filter. As used in the preceding sentence, and in other such uses throughout this disclosure and in the appended claims, the spectral loss profile of the second filter corresponds to the net insertion error function of the first filter in that it further corrects the gain profile, i.e., it further flattens the gain profile of the output optical signals. The optical amplifier may be a single stage or a multi-stage amplifier. For example, in certain exemplary embodiments the optical amplifier comprises a pre-amplification stage and a boost amplification stage. The pre-amplification stage may comprise any suitable device, e.g., a length of erbium-doped optical fiber. Similarly, the boost amplification stage may comprise any suitable device, e.g., a second length of erbium-doped optical fiber. The 2-sided GFF chip, one or more amplifier stages, and other components, e.g. isolators, lenses, waveguides, etc., can be housed, optionally in a common housing, e.g., a hermetically sealed housing. Suitable alternative optical amplifiers and suitable alternative assembly configurations and the like, employing one or multiple housings for the 2-sided chip, amplifier components, and any other components employed, will be readily apparent to those skilled in the art given the benefit of this disclosure.

DETAILED DESCRIPTION OF CERTAIN EXEMPLARY EMBODIMENTS

The following discussion of certain exemplary embodiments of the invention focuses on gain-flattening apparatus used in multiplexed optical signal systems, such as telecommunication systems and the like. GFF apparatus, gain-flattened optical amplifiers employing them, their design and production, and methods of the present invention, however, are applicable generally to optical systems. Reference is made here to commonly assigned U.S. patent application Ser. No. 10/874,559, entitled Gain-Flattening Apparatus And Methods And Optical Amplifiers Employing Same, published on Nov. 10, 2005 as U.S. patent application publication number 20050248832 A1, which is incorporated here by reference in its entirety for all purposes. In certain of the embodiments disclosed here, for convenience of discussion, the gain-flattening apparatus are designed for dense wavelength division multiplexed ("DWDM") telecommunications systems operating in the C-band and employing EDFA amplifiers. However, it will be readily apparent to those skilled in the art, that the GFF apparatus, gain-flattened optical amplifiers employing them and the design and production methods in accordance with the principles disclosed here have application within the scope of the invention to other systems, including telecommunications systems operating in other wavelength bands and using other amplifiers, and to other optical systems calling for gain compensation. It should be understood that the use of a singular indefinite or definite article (e.g., "a," "an," "the," etc.) in this disclosure and in the following claims follows the traditional patent approach of meaning "at least one" unless in a particular instance it is clear from context that the term is intended in that particular instance to denote one and only one.

In certain exemplary embodiments suitable for use in the C-band with EDFA amplifiers, the first filter of the GFF component, i.e., the primary or gross GFF filter coating on a first surface of the optical substrate has a spectral response or transmission curve which corresponds to the non-uniform gain spectrum of an EDFA in the C-band. Thus, the spectral response across the C-band for such first gain-flattening filter of the GFF component in such embodiments will be a transmission curve having what may be said generally to be a two-valley configuration, the approximate inverse of the well-known two-peak configuration of the EDFA gain curve for amplified optical signals across the C-band. Alternative embodiments are suitable for use with a doped optical fiber amplifier for optical signals in the L-band or other optical wavelength bands. In such embodiments the first gain-flattening filter of the GFF component (regardless whether it occurs upstream or downstream of the second GFF filter on the substrate) can be designed and produced with a transmission curve corresponding to, i.e., having a spectral profile generally following the inverse of, the gain profile of a doped optical fiber amplifiers in the C-band or L-band, as the case may be, or other optical wavelength band.

Certain well designed and well manufactured embodiments of the gain-flattening filter components and apparatus disclosed here can provide excellent gain flattening characteristics. In certain such embodiments the peak loss of the first thin-film filter in the wavelength range of interest, e.g., in the C-band or a portion of the C-band, is at least three times the peak loss of the second thin-film filter in the wavelength range of interest. In certain such embodiments the peak loss of the first thin-film filter in the C-band or other wavelength range of interest is at least four times the peak loss of the second thin-film filter. In certain such embodiments the peak loss of the first thin-film filter in the C-band (or other wavelength range of interest) is at least 5 dB and the peak loss of the second thin-film filter in the C-band (or other wavelength range of interest) is less than 2 dB. In certain such embodiments the peak loss in the C-band (or other wavelength range of interest) of the first thin-film filter and second thin-film filter combined is at least 8 dB. In certain such embodiments the peak loss of the first thin-film filter in the C-band (or other wavelength range of interest) is at least three times the peak loss of the second thin-film filter in the C-band (or other wavelength range of interest). In certain such embodiments the net insertion loss error function (PPEF) in the C-band (or other wavelength range of interest) of the first thin-film filter and second thin-film filter combined is less than 0.3 dB. In certain such embodiments the net insertion loss error function (PPEF) in the C-band (or other wavelength range of interest) of the first thin-film filter and second thin-film filter combined is less than 0.2 dB.

Alternative embodiments, for example, are suitable for use with an optical amplifier for optical signals in the S-band. In such embodiments the gross gain-flattening filter of the GFF component of the GFF apparatus is designed and produced with a transmission curve corresponding to the gain profile of an associated amplifier, e.g., a doped optical fiber amplifier, in the S-band. As noted above, the amplifier manufacturer or the optical system designer typically will provide the precise target loss profile to be matched by the GFF apparatus. In the same general manner, alternative embodiments are suitable for use with an associated amplifier in the L-band or other wavelength range.

In certain exemplary embodiments of the GFF apparatus disclosed here, the transmission curve of the gross gain-flattening component corresponds to the gain spectrum of an EDFA and provides compensation of at least about 5 dB, and in certain embodiments at least 6 dB, and in certain embodiments at least 8 dB or more. Recognizing that the error function tends to increase with the modulation depth, the low error function achieved by well designed and well manufactured embodiments of the GFF components and apparatus disclosed here is especially advantageous for applications requiring at least 8 dB of gain correction. The two-sided optical substrate provides significant advantages, including lower insertion loss, since two GFF filters are provided on a single substrate rather than requiring two substrates each carrying a single GFF filter. In addition, in at least certain exemplary embodiments, the additional advantage is provided that less space is required to package a single substrate. This advantage may be significant, for example, in EDFA components integrating a 2-sided GFF chip into the amplifier housing. Also, certain well designed embodiments can be produced at lower cost than a comparable two chip GFF device. Further, with both filters on a single substrate, the need to identify and stock sets of two matching 1-sided chips is avoided.

As disclosed above, low net insertion loss error function is achieved by the GFF components disclosed here at least in part due to the second GFF filter, i.e., the correction or tweak filter, having a transmission curve corresponding to the error function of the first GFF filter. While it is desirable that the first GFF component be operative to correct 100% of the gain unevenness in the optical signals passing through the associated amplifier(s), as noted above this is typically not commercially achieved. Typically, the first GFF filter is operative to provide correction of at least 75%, and often at least about 80% or even 90% or more of the pre-gain-flattened modulation depth of the amplified optical signals. The second GFF filter provides additional correction but, as noted above, has a transmission curve corresponding to the error function of the first GFF filter and yields a smaller net error function and PPEF for the two filters combined. It should also be recognized that certain exemplary embodiments optionally may comprise additional GFF filters, e.g., on additional substrates, providing additional gain correction and/or other functionality.

In certain preferred embodiments, the second GFF filter provides less than 2 dB of gain correction and in certain preferred embodiments less than 1.5 dB of gain correction. As noted above, a gain-flattening filter well designed and produced to have a transmission curve matching a target loss profile to provide gain-flattening for an EDFA or other optical amplifier may have a PPEF of approximately 10% of the gain correction, generally due to routine thin-film design and production limitations and inaccuracies. However, GFF apparatus in accordance with the present disclosure, employing first and second thin-film dielectric gain-flattening filters on the same substrate, where the second filter is not like the first but rather is a correction or "tweak" GFF filter that has a transmission curve which corresponds to the error function of the primary GFF filter, rather than to the original target loss profile for the amplifier, and which has a smaller loss profile than the first GFF filter, can be effective to provide final gain correction with a net insertion loss error function lower than the insertion loss error function of the first GFF component alone. In preferred embodiments wherein the second GFF filter provides less than 2 dB of gain correction, the GFF apparatus can yield gain correction with perhaps only 0.4 dB PPEF or even less than 0.3 dB, and in preferred embodiments comprising well designed and produced components, as little as 0.2 dB or even less. In certain embodiments, for example, the modulation depth of EDFA amplified optical signals in a telecommunications system operating in the C-band can be reduced to less than 0.4 dB, in some preferred embodiments to less than 0.3 dB or even 0.25 dB or less, e.g., to 0.2 dB or less.

Typically only one tweak filter is needed, while multiple primary filters can be usefully employed in some embodiments. In typical embodiments of the gain-flattened EDFAs disclosed here, the transmission curve of a gain-flattening filter employed as the tweak filter provides compensation of not more than about 2 dB of the pre-gain-flattened modulation depth of the amplified optical signal. This is well within the gain compensation range of a single thin-film filter. As noted above, even with a 10% error function, because the gain correction provided by the tweak gain-flattening filter is small, and because it corresponds to the residual non-uniformity of gain left by the primary gain-flattening filter(s), the combined gain correction provided by the gross and tweak filters of the GFF apparatus is significantly improved over gain-flattening apparatus using only two gain-flattening filters designed to have transmission curves equally corresponding to the target loss profile of the amplifier. It should be recognized, that correspondence of the spectral loss profile of a GFF apparatus disclosed here to a target loss profile does not exclude the possibility that the actual spectral loss profile of the GFF apparatus, as packaged, may differ somewhat from the spectral loss profile of the 2-sided chip alone. Connectors, packaging and the like, even passive components packaged with the filter-coated substate, such as ferrules, lenses, etc. may slightly impact the actual spectral loss profile of the GFF apparatus in the field, i.e., in actual use in an optical system, such as a telecommunications system or other optical signal system. Whether or not such effects are taken into account in the design of any particular embodiment of the GFF apparatus disclosed here will depend on the circumstances of that particular embodiment.

In accordance with certain exemplary embodiments, where an optical amplifier requires a peak loss exceeding the practical limit of a single thin-film filter (e.g., exceeds the gain loss that can be achieved using then available and commercially reasonable techniques and materials, etc.), a plurality of filters and/or other GFF devices can be used to perform the primary GFF function of the GFF apparatus. For example, a combination may be suitable, of thin-film filter(s), fiber Bragg grating(s) and/or other devices designed to the target loss profile. For example, where the modulation depth exceeds the gain equalization capacity of a single, commercially practical, thin-film gain-flattening filter, multiple thin-film gain-flattening filters can be used in series to correct, i.e., flatten, the gain of the associated optical amplifier. In certain exemplary embodiments the primary gain correction is equally divided between or among multiple gain flattening filters. In certain embodiments, for example, multiple gain flattening filters all from the same manufacturing batch, e.g., from the same wafer, perform the primary gain flattening. Such multiple filters optionally can be packaged in a common housing or in separate housings.

Thin-film filters employed in certain exemplary embodiments of the GFF apparatus disclosed here for gain compensation, e.g., with an EDFA or other optical amplifier, can be designed and manufactured in accordance with any technology, equipment and techniques now known or known in the future, that are suitable for producing filters having a transmission curve with a loss profile sufficiently accurately corresponding to the gain profile of the optical amplifier (in the case of the primary gain-flattening filter(s)) or to the error function of the first GFF component (in the case of the tweak or second gain-flattening filter). Suitable filters can be designed in accordance with current techniques, e.g., using commercially available software, such as Essential Macleod software, a comprehensive software package for the design and analysis of optical thin films, or TFCalc from Software Spectra Inc., etc. Suitable filters can be manufactured in accordance with various currently known techniques, such as sputtering evaporation or ion-assisted evaporation tuning techniques, etc. In accordance with certain exemplary embodiment, the second gain-flattening filter is applied to the second surface of the optical substrate without altering the transmission shape of the first gain-flattening filter. This can be achieved, for example, by depositing the first filter on the first side of the substrate, e.g., a glass disk or the like. Optionally, the coated substrate then is thinned to (or near to) a desired thickness and/or to a desired bevel or angle, e.g., an angle of 0.1 to 0.4 degrees, e.g., 0.25 degrees, to avoid etaloning or for other purpose in the finished product. The filter optionally is tuned, e.g., temperature tuned, at this point. Optionally, the coated substrate then is subjected to "couponing," that is, cutting out useful sections of the disk, e.g., sections which are 0.5 inches to 1.5 inches on each side, e.g., 0.75" by 1.0 inch coupons. The second side of the substrate can then be coated with the "tweak" GF filter, preferably after measuring the error function of the first filter. Alternatively, as noted above, the first and tweak GF filters can be applied to separate substrates that are joined after tuning, thickness reduction, beveling, etc. other wise in general keeping with the procedures described here or other suitable production procedures. Alternative suitable techniques will be apparent to those skilled in the art given the benefit of this disclosure.

Figure 1:
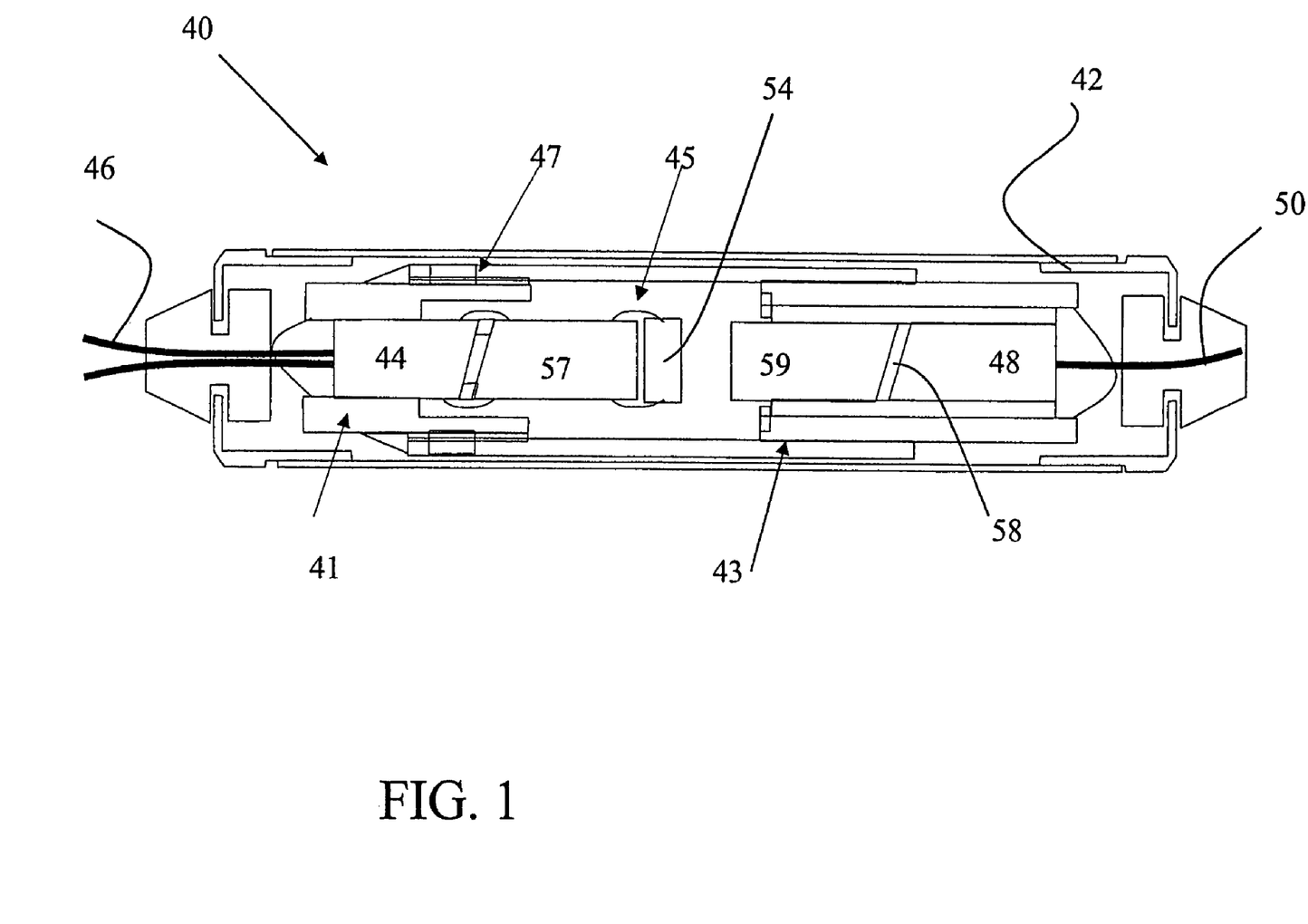
FIG. 1 is a schematic section view of gain flattening apparatus in accordance with an exemplary embodiment of the present invention.

A suitable construction for a gain-flattening component in accordance with certain exemplary embodiments of the present disclosure is shown in FIG. 1. GFF component 40 is suitable, for example, for in-line compensation of the spectral gain profile of an EDFA for optical signals in the C-band. GFF component 40 comprises a housing 42 in which is housed a first ferrule 44 providing an input optical fiber 46 for carrying optical signals into the housing, and a second ferrule 48 disposed in the housing at the opposite end and providing an output optical fiber 50 for carrying optical signals out of the housing. Housed in the housing between the first and second ferrules is a 2-sided gain-flattening component 54 mounted between GRIN lens 57 and GRIN lens 59. As discussed further below, component 54 has a primary GFF filter on its left-facing (as viewed in FIG. 1) surface, and a correction or tweak GFF filter on its right-facing surface. The primary filter has a transmission curve corresponding to the gain profile of an EDFA or other associated optical amplifier. In alternative embodiments, one or more additional gain-flattening filters can be mounted in the housing in series with component 54 to provide further primary gain flattening. The tweak filter has a transmission curve corresponding to the error function of a primary GFF filter of component 54. (It should be understood that the terms GF filter and GFF filter are used interchangeably in this description and in the appended claims.) Mounting components in housing 42 include gold-plated stainless steel fixtures 41 and 43, epoxy blobs 45 and solder 47. (Only representative epoxy blobs and solder are labeled.)It will be recognized by those skilled in the art, given the benefit of this disclosure, that alternative and/or additional components may be employed in the GFF apparatus disclosed here and in gain-flattened amplifiers disclosed here comprising such GFF apparatus. Alternative and additional components include those presently known and those developed over time in the future. Multiple ferrule designs are known, for example, and it will be within the ability of those skilled in the art to select and employ suitable ferrules, if any, in various different embodiments of the GFF apparatus and gain-flattened amplifiers disclosed here. Likewise, multiple alternative designs are known for collimating lenses and other lenses which may be used, including ball lenses, GRIN lenses, barrel lenses, etc. Thus, for example, ball lenses and/or collimating lenses may be used in place of the GRIN lenses of the embodiment shown in FIG. 1.

Figure 2:
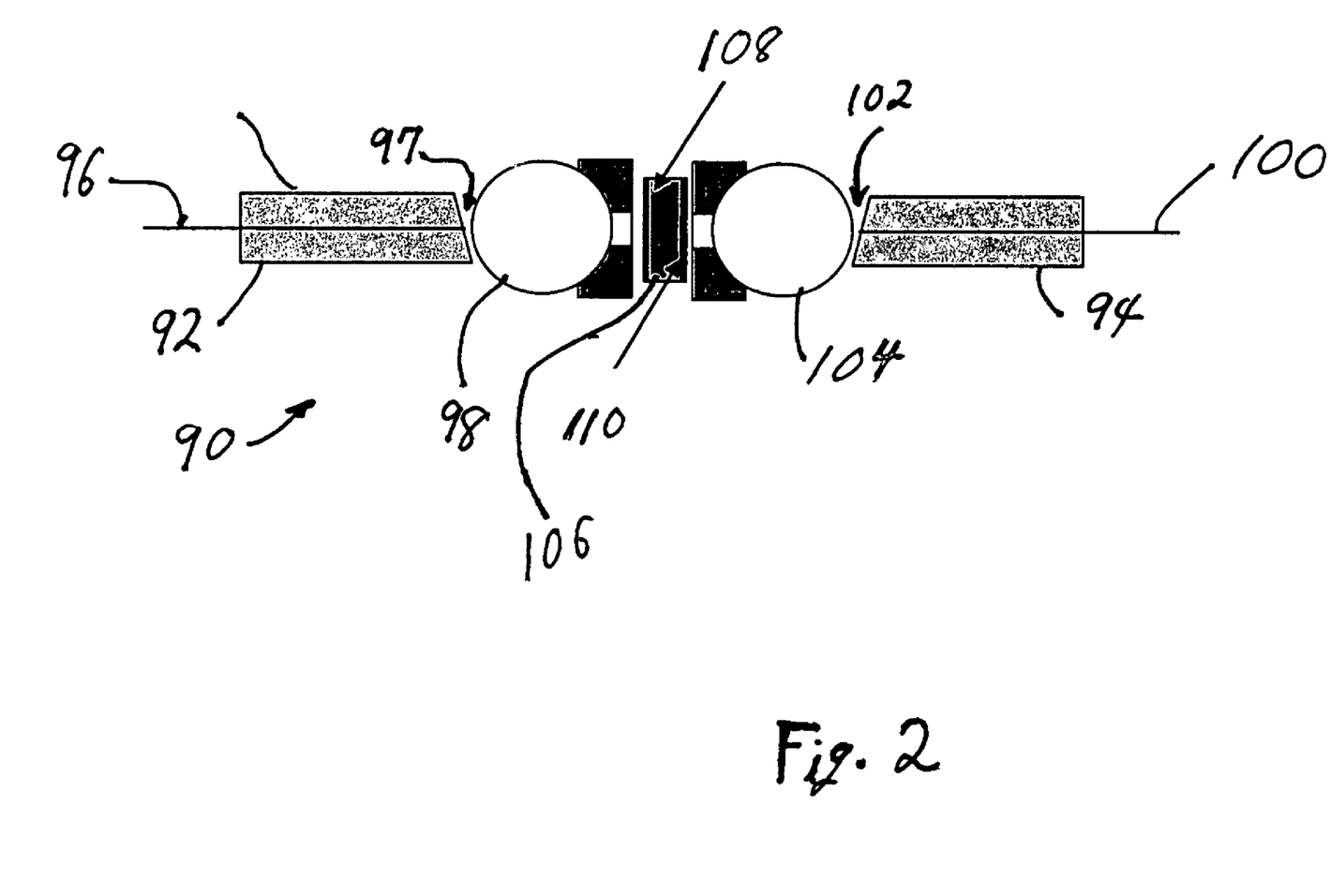
FIG. 2 is a schematic section view of gain flattening apparatus in accordance with an exemplary embodiment of the present invention.
Figure 3:
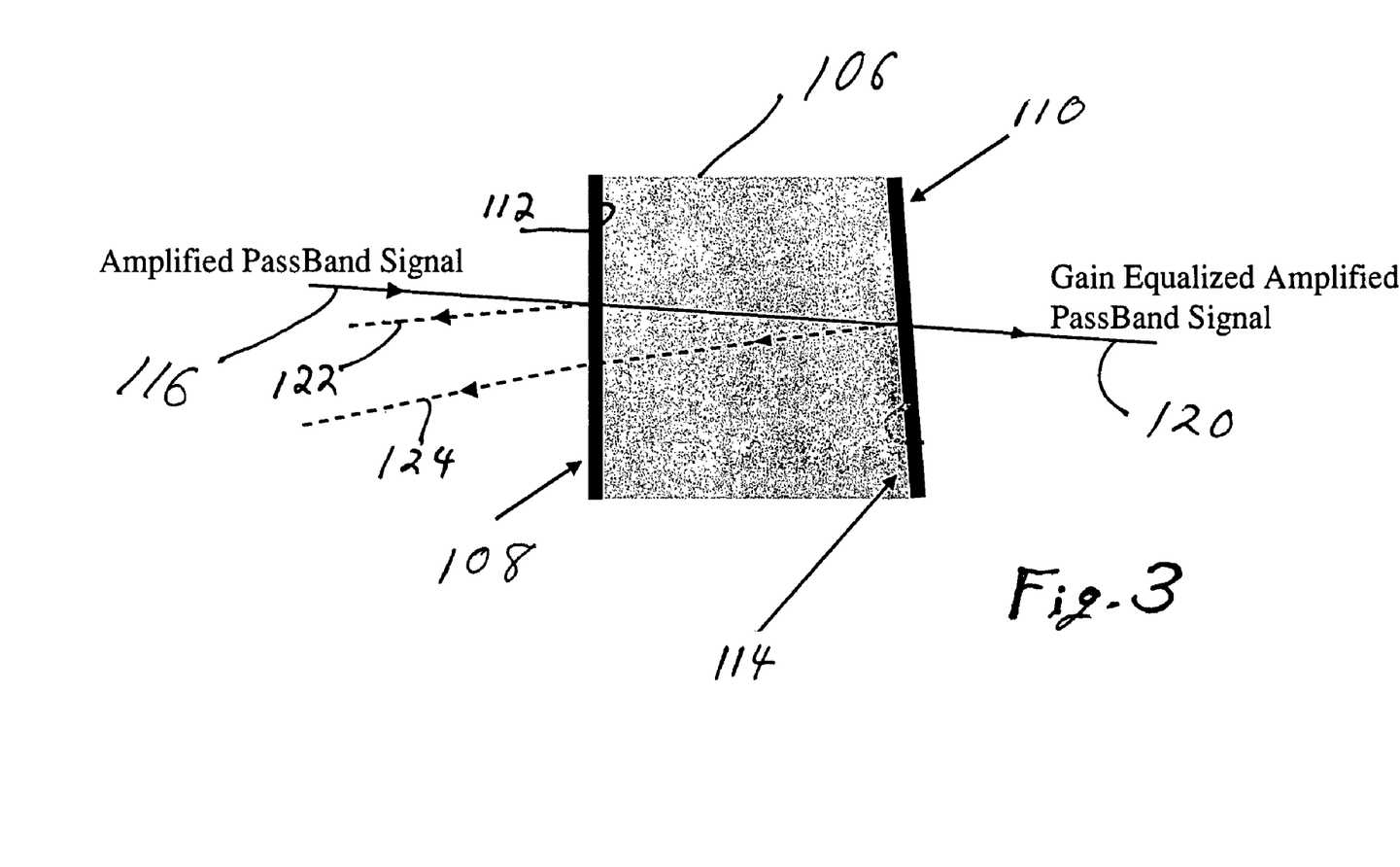
FIG. 3 is a schematic section view of the 2-sided GFF chip employed in the exemplary embodiment of FIG. 2.

Referring now to FIGS. 2 and 3, gain flattening apparatus 90 is seen to comprise an input ferrule 92 and an output ferrule 94. Those skilled in the art will recognize that reference to either ferrule as the input or output ferrule is in some cases arbitrary, and optical signals may travel in either or both directions. Suitable ferrules include, for example, smf28 fiber ferrules. Ferrule 92 provides input fiber 96 leading to launch court 97 position and oriented for launching optical signals to ball lens 98. Similarly, ferrule 94 provides optical fiber 100 leading to optical port 102 which is positioned and oriented to pass optical signals to and/or from ball lens 104. And optical path extends through the component, from port 97 through lens 98, then through GFF chip 106, then through lens 104 to port 102. Mounting fixtures 105, 106 are provided, and typically would be suitable for positioning the aforesaid components in a housing (not shown). Optical chip 106 has a primary gain flattening filter 108 on the surface 112 facing port 97. Optical chip 106 has a tweak filter 110 on the surface 114 facing port 102. In order to reduce etaloning, surface 114 of chip 106 is angled or wedged. That is, it is not parallel to surface 112. For example, surface 114 may be provided 0.25° wedge. In operation, optically amplified signals 116 travel along the optical path through primary GFF filter 108, through the bulk of optical substrate 106 and then through tweak filter 114. In this way, gain equalized optical signals 120 are passed to port 102. Also seen are optical paths 120 to 124 of reflected signals. Numerous alternatives to the various components and their configurations, orientations, etc. described here will be apparent to those skilled in the art given the benefit of this disclosure. For example, GRIN lenses or other suitable lenses may be used in place of one or both ball lenses.

In accordance with a method aspect of the present invention, gain-flattening filter apparatus comprising a first or gross GFF filter and a second or tweak GFF filter, in accordance with principles set forth above, is designed and manufactured to have—in combination or cooperation, a transmission curve corresponding to the gain profile of EDFAs or other optical amplifiers. In accordance with certain exemplary embodiments, the method comprises designing a first GFF filter to have a transmission curve with a spectral loss profile corresponding to a target loss profile for an optical amplifier. That primary filter is manufactured and the error function of the GFF component with that one filter (optionally, as packaged for use in the field) is determined, e.g., by direct measurement. The second GFF filter is then designed to have a transmission curve with a spectral loss profile corresponding to the error function of the first GFF filter, and then deposited or otherwise applied to the opposite or other surface of the optical substrate. The transmission curve of the second or tweak GFF filter may correspond to the error function of the first GFF filter unpackaged or to the error function of the first GFF filter as packaged and, optionally, taking into effect any impact of other components of the apparatus. Optionally, the error function of the first GFF filter, to serve as the target loss profile for the second GFF component, can be determined by theoretical calculation based on the planned design of the first GFF filter. Alternatively (or in addition) the error function of the first GFF filter can be determined empirically, such as by actual measurement of the error function of the first GFF filter. In embodiments employing empirical determination of the error function, it can be determined on a unit-by-unit basis, lot-by-lot basis or both. The error function of the first GFF filter optionally is determined, whether by theoretical calculation, empirically or both, based on the first GFF filter alone or in assembly with other components and/or devices of the apparatus. For optional lot-by-lot determination of the error function, for example, GFF components s can be produced with the primary filter, e.g., as portions of an optical wafer or disc to be diced, and their error functions (alone or in assembly) measured to determine the target transmission curve of the second GFF filter to be applied, in batch, to the opposite side of the wafer. For optional unit-by-unit determination of the error function, for example, the first GFF filter can be applied and the error function (alone or in assembly) measured to determine the target transmission curve of the second GFF filter.

Figure 4:
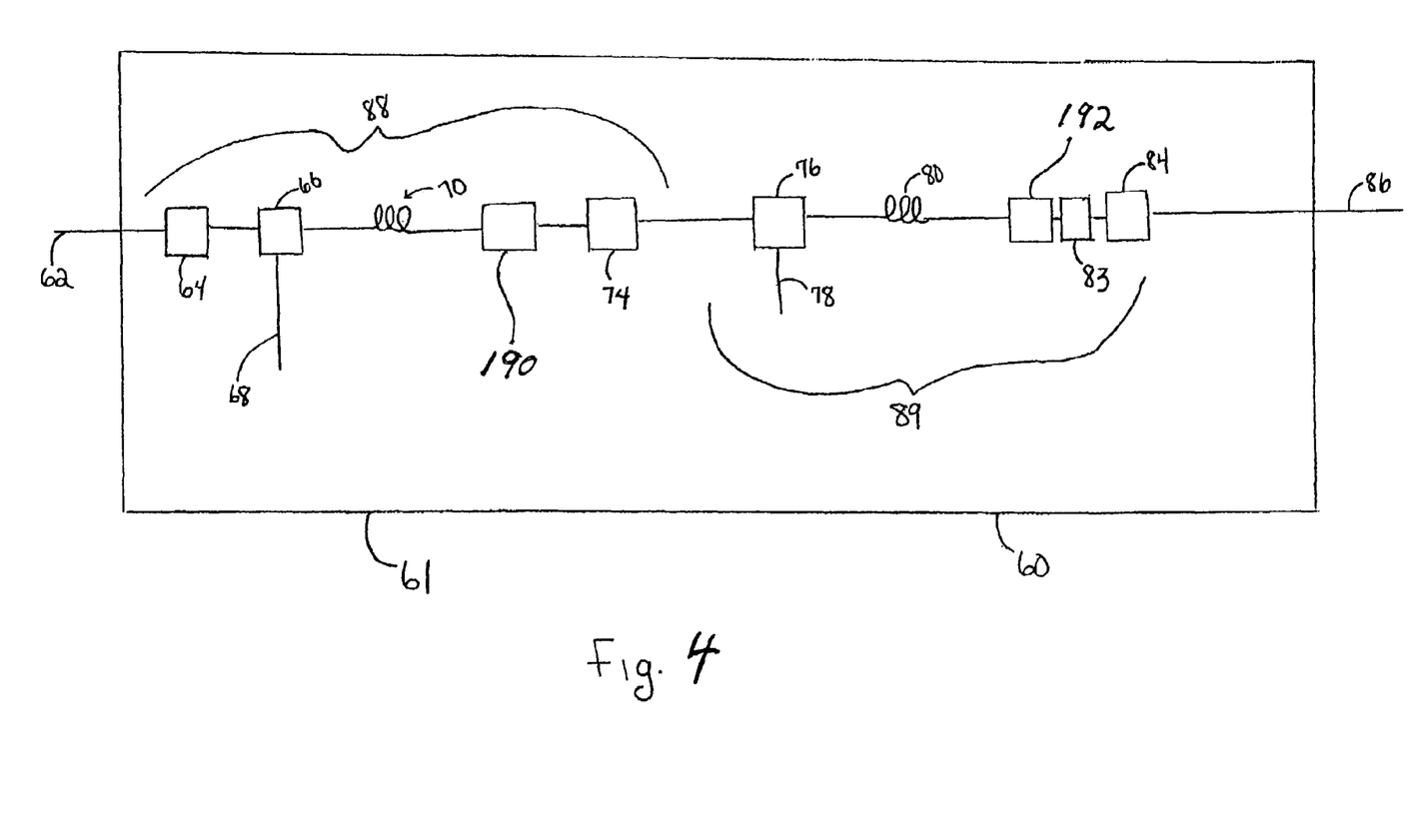
FIG. 4 is a schematic view of the optical amplifier in accordance with an exemplary embodiment of the present invention.

Referring now to FIG. 4, an optical amplifier 60 in accordance with certain exemplary embodiments of the invention disclosed here is seen to comprise fiber coils, such as erbium-doped fiber coils or the like, for amplification of multiplexed signals, such as multiplexed signals in the C-band, as well as GFF apparatus for gain compensation, housed together in housing 61. Optical fiber 62 carries multiplexed optical signals into housing 61 to an isolator 64. From isolator 64 the optical signal travels to multiplexing (mux) device 66 which also receives pumped optical input from a suitable source (not shown) via optical fiber 68 at a suitable wavelength for EDFA amplification, such as about 980 nm or 1480 nm or other suitable wavelengths. The combined optical output is fed to a suitable length of erbium-doped optical fiber packaged in the housing as coils 70, for amplification of the aforesaid multiplexed optical signals. The amplified signals, with uneven gain typical of EDFA amplification, is fed to a gain flattening component 190 corresponding generally to component 90 described in connection with FIGS. 2 and 3, above. Component 190 has an optical substrate with a primary filter on one surface having a loss profile corresponding to the gain profile of coils 70. Component 190 has a tweak filter on a second surface of the optical substrate, having peak loss less than 2 dB or even less than 1 dB, with a transmission curve corresponding to the error function of the primary filter. The output from component 190 is fed to isolator 74. It will be understood that component 190 in alternative embodiments, e.g., where greater gain compensation is required, may be supplemented by one or more additional primary GFF filters, etc. Following in series from isolator 74, signals are fed to mux device 76 which receives pumped optical input from a suitable source (not shown) via optical fiber 78 at a suitable wavelength for EDFA amplification. The combined optical output is fed to a suitable length of erbium-doped optical fiber packaged in the housing as coils 80, for further amplification. The amplified signals, having a transmission curve typical of EDFA amplification and residual gain unevenness due to the error function of filter 72, is fed to gain-flattening component 192 again corresponding generally to component 90 described in connection with FIGS. 2 and 3, above. Component 192 comprises an optical substrate having a primary or gross gain-flattening filter on a first surface. Such primary filter may have, e.g., peak loss greater than 5 dB and a transmission curve corresponding to the gain profile of fiber coils 80. Component 192 also comprises a tweak filter on the second surface of its optical substrate, having peak loss less than 2 dB and a transmission curve corresponding to the error function of its primary filter. As for component 190, component 192 may be supplemented by additional GFF components, such as optional component 83, e.g., where greater gain compensation is required. From optional component 83 optical signals pass to isolator 84. Multiplexed signals, amplified and gain-flattened by the EDFA and GFF apparatus of amplifier 60, are carried out of housing 61 via optical fiber 86. As noted above, various additional components may be incorporated into gain-corrected amplifier 60.

The optical elements from isolator 64 to isolator 74 may be considered a pre-amplifier or first stage amplifier 88 of gain-corrected amplifier 60. The optical elements from isolator 74 to isolator 84 may be considered a boost or second stage amplifier 89. Typically, only one of components 190, 192 requires a tweak filter, having a transmission curve corresponding to the combined error function of the two primary GFF filters. Optionally, components 190, 192 may be combined, with a single optical substrate carrying a primary GFF filter operative for gain compensation for both amplifier stages combined. Optionally, the first and second amplification stages can be packaged separately, i.e., in separate housings. This may be advantageous, for example, in order to allow access between the two stages for monitoring, auxiliary signal treatment, etc. Such auxiliary signal treatment between stages of a multi-stage optical amplifier can include, for example, dispersion compensation which may be performed by passing the partially amplified signals through a suitable length of dispersion compensation fiber or other suitable device. Auxiliary signal treatment between stages of a multi-stage optical amplifier also can include, for example, mux/de-mux processing to add and/or drop signals, etc. For purposes of the present disclosure, the two amplification stages in this embodiment may be considered to be parts of the same optical amplifier comprising both fiber coils 70 and 80. It will be understood by those skilled in the art, given the benefit of this disclosure, that the two GFF components 190, 192, even if the loss profile of their respective transmission curves are not identical to one another, subject to noise and other constraints, may be swappable or switchable with each other without unacceptable adverse impact on the total gain correction provided by the GFF apparatus. If the two filters are not identical, switching their positions would be expected to have an impact on gain or other characteristics of the optical signals at the point where they pass from the first stage 88 to second stage 89, i.e., between the two stages, and this may be unwanted in alternative embodiments where the two stages are housed in separate housings so as to provide access between the two stages for signal treatment, as mentioned above.

Although the present invention has been described in terms of specific exemplary embodiments, it will be appreciated that various modifications and alterations will be apparent from this disclosure to those skilled in the art, without departing from the spirit and scope of the invention as set forth in the following claims.

We claim:

1. A gain-flattening component for compensation of at least a portion of the spectral gain profile of an optical amplifier for optical signals in an optical wavelength range, comprising:
    an optical substrate;
    a gain-flattening filter disposed on a first surface of the optical substrate, the gain-flattening filter having a transmission curve with a spectral loss profile corresponding to the spectral gain profile of the optical amplifier for optical signals in the optical wavelength range, and having a net insertion loss error function relative to the spectral gain profile of the optical amplifier for optical signals in the optical wavelength range; and
    a thin-film filter disposed on a second surface of the optical substrate, the thin-film filter having a transmission curve with a spectral loss profile corresponding to the net insertion error function of the gain-flattening filter for optical signals in the optical wavelength range.

2. The gain-flattening component of claim 1 wherein the second surface of the optical substrate is opposite to the first surface of the optical substrate.

3. The gain-flattening component of claim 1 wherein the wavelength band lies in the C-band.

4. The gain-flattening component of claim 1 wherein:
   a. the gain-flattening filter on the first surface of the optical substrate has a transmission curve in the C-band with a spectral loss profile corresponding to an EDFA spectral gain profile in the C-band, and
   b. the thin-film filter on the second surface of the optical substrate has a transmission curve in the C-band with a spectral loss profile corresponding to the error function of the gain-flattening filter for optical signals in the C-band.

5. The gain-flattening component in accordance with claim 4 wherein the peak loss of the gain-flattening filter in the C-band is at least three times the peak loss of the thin-film filter in the C-band.

6. The gain-flattening component in accordance with claim 4 wherein the peak loss of the gain-flattening filter in the C-band is at least four times the peak loss of the thin-film filter in the C-band.

7. The gain-flattening component in accordance with claim 4 wherein the peak loss of the gain-flattening filter in the C-band is at least 5 dB and the peak loss of the thin-film filter in the C-band is less than 2 dB.

8. The gain-flattening component in accordance with claim 4 wherein the peak loss in the C-band of the gain-flattening filter and thin-film filter combined is at least 8 dB.

9. The gain-flattening component in accordance with claim 4 wherein the peak loss of the gain-flattening filter in the C-band is at least three times the peak loss of the thin-film filter in the C-band.

10. The gain-flattening component in accordance with claim 4 wherein the net insertion loss error function (PPEF) in the C-band of the gain-flattening filter and thin-film filter combined is less than 0.3 dB.

11. The gain-flattening component in accordance with claim 4 wherein the net insertion loss error function (PPEF) in the C-band of the gain-flattening filter and thin-film filter combined is less than 0.2 dB.

12. The gain-flattening component in accordance with claim 7 for in-line compensation of the spectral gain profile of an EDFA for signals in the C-band, further comprising:

a. a housing;
b. a first ferrule disposed in the housing and providing an input optical fiber for carrying optical signals into the housing; and
c. a second ferrule disposed in the housing and providing an output optical fiber for carrying optical signals out of the housing, an optical path extending in the housing between the input optical fiber and the output optical fiber;

wherein the optical substrate is housed in the housing with the gain-flattening filter and the thin-film filter of the optical substrate in the optical path between the input optical fiber and the output optical fiber.

13. The gain-flattening component of claim 1 wherein the optical wavelength range is in the L-band.

14. The gain-flattening component of claim 1 wherein the optical wavelength range is in the S-band.

* * * * *